United States Patent
> Frisch

[15] 3,685,123
[45] Aug. 22, 1972

[54] MEANS FOR RETAINING AND HANDLING REACTOR O-RING SEALS

[72] Inventor: Erling Frisch, Pittsburgh, Pa.

[73] Assignee: Westinghouse Electric Corporation, Pittsburgh, Pa.

[22] Filed: July 8, 1970

[21] Appl. No.: 53,199

[52] U.S. Cl. ..................29/239, 29/252, 29/282
[51] Int. Cl. ..................B23p 19/04, B21d 39/00
[58] Field of Search........29/238, 239, 252, 255, 282, 29/426, 427; 269/24, 51, 56, 58

[56] References Cited

UNITED STATES PATENTS 3,069,761  12/1962  Sommer ......................29/252
2,503,426  4/1950  Tower ......................29/255 X Primary Examiner—Andrew R. Juhasz
Assistant Examiner—Gary L. Smith
Attorney—A. T. Stratton, Z. L. Dermer and M. B. L. Hepps

[57] ABSTRACT

Metal O-rings are normally utilized on pressurized water reactors to obtain hermetic sealing between the pressure vessel and the closure head. The O-rings must be replaced by new rings every time the reactor vessel is opened. This is a difficult task because of the flexibility of the O-rings, which may be 15 feet in diameter, and because replacement of the rings, when located on the vessel flange, must be made under approximately 20 feet of water. The task is simplified by providing a rigid retaining ring for each O-ring and a replacement fixture for handling two O-rings and their retaining rings.

10 Claims, 6 Drawing Figures

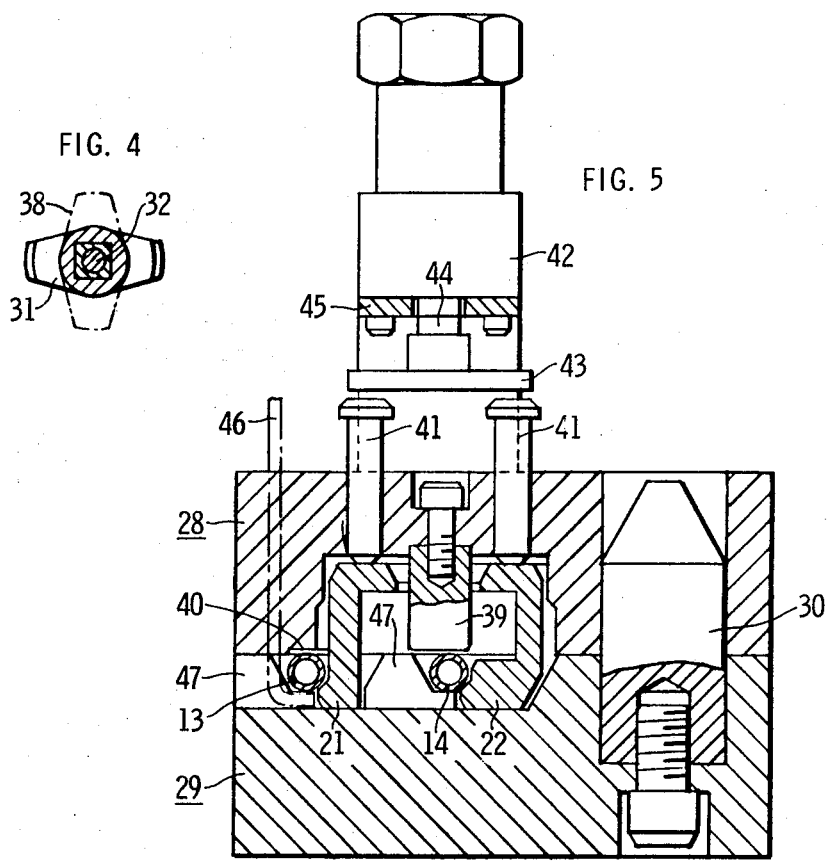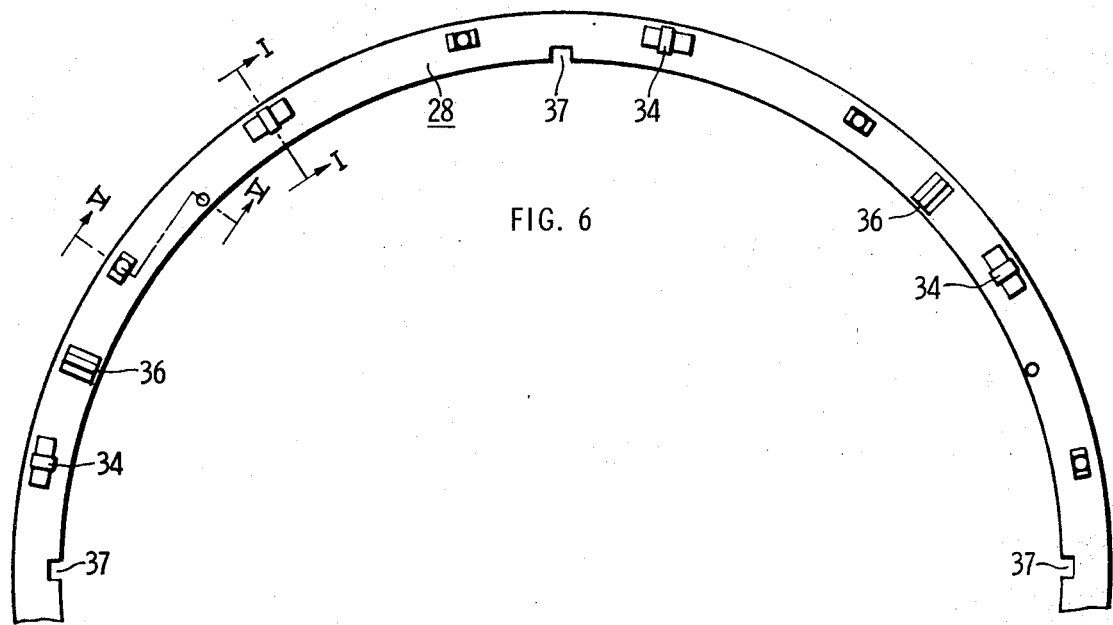

MEANS FOR RETAINING AND HANDLING REACTOR O-RING SEALS

CROSS REFERENCE TO RELATED APPLICATIONS

This application relates to the following applications concurrently filed herewith:

Ser. No. 53,207, filed July 8, 1970 (WE 41,957) entitled "Means for Rapidly exposing the Core of a Nuclear Reactor For Refueling" by Erling Frisch and Harry N. Andrews.

Ser. No. 53,203, filed July 8, 1970 (WE 41,909) entitled "Cable Support Structure For Enabling A Nuclear Reactor to be Refueled Rapidly" by Erling Frisch and Harry N. Andrews.

Ser. No. 53,201, filed July 8, 1970 (WE 41,885) entitled "Rapidly Refuelable Nuclear Reactor" by Erling Frisch and Harry N. Andrews.

Ser. No. 53,200, filed July 8, 1970 (WE 41,901) entitled "Combination of Nuclear Reactor and Missile Shield" by Erling Frisch and Harry N. Andrews.

Ser. No. 53,198, filed July 8, 1970 (WE 41,903) entitled "Hydraulic Head Closure Mechanism" by Erling Frisch and Harry N. Andrews.

Ser. No. 53,202, filed July 8, 1970 (WE 41,642) entitled "Rapidly Refuelable Nuclear Reactor" by Harry N. Andrews and Richard S. Orr.

BACKGROUND OF THE INVENTION

This invention relates, generally, to reactor O-ring seals and, more particularly, to means for retaining and handling the O-rings during replacement.

The necessary hermetic seal between the pressure vessel and the closure head of a pressurized water reactor may be obtained by a pair of self-energized metal O-rings of a type available in the market. The O-rings, which have a tube diameter of .5 inch and are provided with a thin coating of silver, are located in concentric grooves in the horizontal surface of the vessel flange or the closure head flange. The self-energizing feature is achieved by drilling holes in the high pressure side of the tube wall. The purpose of the holes is to obtain high pressure in the tube interior to force the tube into firm contact with the groove and also to prevent collapse of the tube.

Initially, the O-ring grooves were machined in the pressure vessel flange. However, it proved to be such a difficult and time consuming task to pick the O-rings out of the grooves and replace them with new O-rings during each refueling period, when the flange is submerged under 20 ft. of water, that it was decided to place the grooves in the closure head flanges. To prevent the O-rings from dropping out when the head was removed, they were retained by several tabs projecting through the pressurizing holes of the tubing and fastened by screws. Removal and replacement of the rings took place while the closure head was suspended by a crane at a storage location. Although the work was performed under atmospheric conditions, it was, by no means, a simple task considering that the O-rings to be handled are 15 ft. in diameter and that the radiation level for the closure underside is quite high.

In the rapid refueling system, disclosed in the concurrently filed applications, the upper internals of the reactor are attached to the closure head during refueling, making it necessary to keep the heads submerged, at least partly. This, coupled with the presence of the permanently located closure bolts, makes it almost impossible to replace the O-rings if they are located on the closure head flange. Therefore, it becomes necessary to again change the location of the O-rings to the vessel flange and a method must be found to simplify the replacement operation at this location. The main obstacle to using the pressure vessel flange for the O-ring location is the flexibility of the O-rings, which prevents them from retaining their shape, and makes removal, handling, and replacing under water such a difficult task.

SUMMARY OF THE INVENTION

In accordance with the present invention, the flexible O-rings, which form a seal between a reactor vessel flange and the closure head flange, are backed up with retaining rings having a much larger cross section and, consequently, greater rigidity. The retaining rings, which remain on the vessel flange during operation of the reactor, are provided with upper flanges or lips extending into grooves in the underside of the head flange. Lifting cams on a portable handling ring are rotated under the lips, thereby permitting simultaneous lifting of both the retaining rings and the O-rings. The O-rings are replaced at a convenient location, away from the main reactor area, after which the retaining rings and the new O-rings are picked up by the handling ring, which is guided into place on the vessel flange with the assistance of the closure head guide pins, and the retaining rings and the O-rings are deposited in the grooves in the vessel flange.

BRIEF DESCRIPTION OF THE DRAWINGS

For a better understanding of the nature of the invention, reference may be had to the following detailed description, taken in conjunction with the accompanying drawings, in which:

FIG. 4 is a detail view, taken along the line IV—IV in FIG. 1, of a lifting cam which is a part of the handling fixture;

FIG. 5 is a view, in section, taken along the line V—V in FIG. 6, of the handling fixture and a stationary fixture ring provided to facilitate replacement of the O-rings, and FIG. 6 is a view, on a reduced scale, in plan, of a portion of the handling ring.

DESCRIPTION OF THE PREFERRED EMBODIMENT

Figure 3:
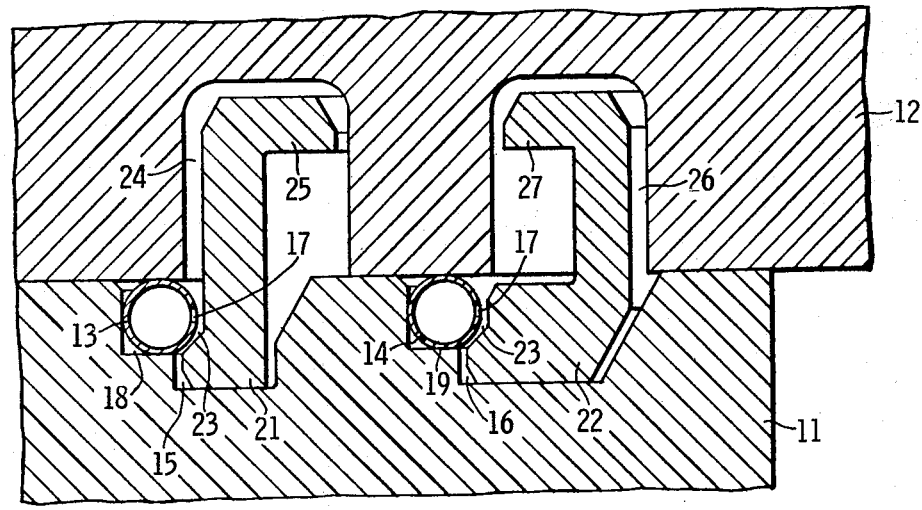
FIG. 3 is a sectional view to approximately full scale of portions of the vessel and the head flanges with the O-rings and their retaining rings in their operating positions in the flanges.

Referring to the drawings, particularly to FIG. 3, the structure shown therein comprises a portion of a flange 11 which is formed integrally with a reactor pressure vessel (not shown) and a portion of a flange 12 which is formed integrally with the closure head (not shown) for the reactor vessel. The vessel may be of a type, well known in the art, suitable for use in a nuclear reactor power system. The closure head may be retained on the vessel during operation of the reactor by means of holding bolts (not shown) extending through the flanges 11 and 12.

In order to provide the necessary hermetic seal between the pressure vessel and the closure head of the reactor, which may be of the pressurized water type, two tubular metallic O-rings 13 and 14 are disposed in grooves 15 and 16, respectively, cut in the top surface of the vessel flange 11. The O-rings are of the self-energizing type and have a plurality of holes 17 drilled in the inside wall of each O-ring to improve the sealing properties and prevent collapse of the tubular O-ring during high pressure operation. The O-ring 13 rests on a horizontal ledge 18 in the groove 15. Likewise, the O-ring 14 rests on a horizontal ledge 19 in the groove 16. The O-rings are deflected or squeezed slightly, when the head flange is secured, to provide sealing at lower pressures.

As explained hereinbefore, the O-rings are relatively flexible and are difficult to handle in view of the large diameter of the O-rings utilized in large reactor vessels. Therefore, a retaining ring 21 is associated with the O-ring 13 and a retaining ring 22 is associated with the O-ring 14. The retaining rings have sufficient cross-section to insure adequate rigidity for easy handling. Each retaining ring remains in the groove with its associated flexible O-ring during operation of the reactor and serves to support the O-ring on a beveled ledge 23 when removed from the groove. It should be noted that the grooves are so shaped that direct contact between the O-rings and the retaining rings is avoided when they are positioned in the grooves during normal operation of the reactor.

The retaining ring 21 extends vertically into a groove 24 in the head flange 12 and is provided with a horizontally extending flange or lip 25 at the top of the vertical portion of the retaining ring. Likewise, the retaining ring 22 extends vertically into a groove 26 in the underside of the head flange 12 and is provided with a horizontally extending lip 27 at the top of the vertical portion of the retaining ring. The lips 25 and 27 extend toward each other. The flanges or lips serve as a means for seizing and holding the retaining rings during O-ring replacement as will be described more fully hereinafter.

In order to facilitate replacement of the O-rings during refueling of the reactor, a special replacement fixture is provided. As shown more clearly in FIG. 5, the replacement fixture comprises a portable handling ring 28 and a stationary ring 29, both fabricated from steel and having sufficient cross section to be quite rigid. Since the portable ring 28 may be submerged in water for extended periods, it preferably should be made of stainless steel. The stationary ring 29, which is permanently mounted in a convenient location, is provided with grooves in its top surface substantially duplicate of the grooves 15 and 16 in the vessel flange 11. Three alignment pins 30 serve to achieve accurate positioning of the portable ring 28 when it is seated on the stationary ring 29 as shown in FIG. 5.

Figure 1:
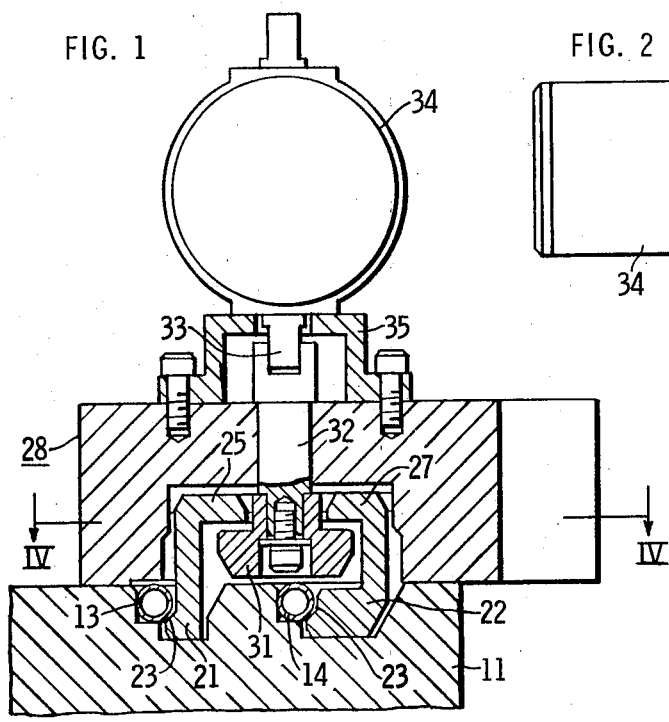
FIG. 1 is a view, in section, taken along the line I—I in FIG. 6, of a portion of a reactor vessel flange with O-ring seals, retaining rings and a portable handling ring, embodying principal features of the invention, disposed on the flange.
Figure 2:
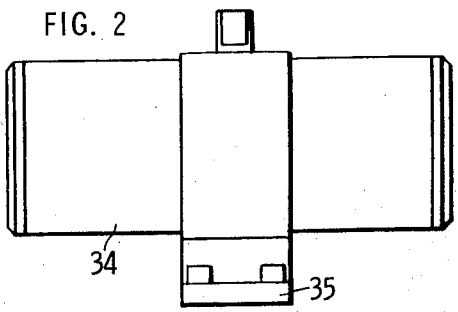
FIG. 2 is a view, in side elevation, of a pneumatic rotary actuator which is a part of the handling ring shown in FIG. 1.

As shown more clearly in FIGS. 1 and 6, the portable handling ring 28 is provided with eight relatively narrow lifting cams 31, equally spaced and supported on the ring 28 by stud shafts 32. Each shaft is joined, by a slot-and-key coupling 33, to a double acting fluid pressure rotary actuator 34 secured to the upper ring surface by mounting brackets 35. The actuators 34 are preferably of the pneumatic type, but actuators of other suitable types may be utilized if desired. By means of the actuators, the cams 31 may be rotated simultaneously over a 90° angle as shown in FIG. 4. The center line of the cams is located on a circle having the same diameter as the midpoint between the lips 25 and 27 on the retaining rings 21 and 22, respectively.

During refueling, after the reactor closure head has been removed and stored, the portable handling ring 28 is placed in position on the vessel flange 11 as shown in FIG. 1. Three equally spaced lifting lugs 36 (FIG. 6) are provided on the handling ring 28 for manipulation by a crane. Accurate positioning of the handling ring 28 on the vessel flange is achieved by four slots 37 in the inner surface of the ring which align with guide pins on the vessel normally used for alignment of the closure head 12.

While placing the handling ring 28 on the vessel flange 11, the cams 31 are in a position, as indicated by dot-dash line 38 in FIG. 4, to permit insertion without interfering with the retaining ring lips. After the handling ring is properly positioned, the cams 31 are rotated by means of the actuators 34 to a position, as shown in full lines, in which the tips of the cams are directly under the lips 25 and 27. The retaining rings 21 and 22 are now captured and will be pulled out of the grooves 15 and 16 together with the O-rings 13 and 14 when the handling ring 28 is raised by means of a crane. The O-rings rest on the beveled ledges 23 on the retaining rings while being lifted and carried by the retaining rings.

In order to replace the used O-rings with new rings, the portable handling ring which is carrying the retaining rings and the used O-rings, is positioned on the stationary ring 29 on which the O-rings are properly seated in the grooves in the stationary ring by contact with the undersides of several pins 39 on the portable ring 28 and a ledge 40 on the underside of the portable handling ring. The lifting cams 31 are now rotated to the "release" position 38 and the portable handling ring 28 is removed, thereby exposing the retaining rings 21 and 22 and the O-rings 13 and 14.

To prevent accidental removal of these rings, resulting from possible contact with the handling ring during its removal, a slight downward force is applied to the retaining rings by hold-down pins 41 while the handling ring is lifted. This force is generated by eight, equally spaced, air cylinders 42 and is transmitted to the pins 41 through large diameter buttons 43 attached to piston shafts 44. The pistons are retracted by internal springs when the pressure is removed. The air cylinders 42 are mounted on brackets 45 attached to the portable handling ring 28 by bolting.

After the handling ring 28 has been removed, the used O-rings are picked up by simple hand tools 46 in several radial slots 47 cut in the upper surface of the stationary ring 29, and are replaced by new O-rings. These, together with the reusable retaining rings, are now picked up by the portable handling ring 28 and are deposited in the grooves in the vessel flange in the manner hereinbefore described with reference to the depositing of the used O-rings in the stationary ring 29. The portable handling ring 28 should be left in place on the vessel flange during the entire refueling period to protect the grooves against mechanical damage.

From the foregoing description it is apparent that the invention provides a means for retaining and handling relatively flexible O-ring seals which must be replaced every time a nuclear reactor is refueled. The means hereindescribed simplifies, and reduces the time required to perform, the replacement operation which heretofore has been difficult because of the flexibility of the O-rings, and, principally, because replacement of the rings, when located on the reactor vessel flange, must be made under approximately 20 feet of water. The apparatus herein-described is relatively simple in operation and it may be economically manufactured.

I claim:

1. Means for retaining and handling O-ring seals for a reactor pressure vessel and closure head having flanges thereon with at least one annular groove in the vessel flange and at least one relatively flexible O-ring disposed in the groove to engage the head flange, comprising a relatively rigid retaining ring having a ledge disposed to underlie at least a portion of the O-ring, said head flange having a groove therein above the groove in the vessel flange, said retaining ring extending vertically into the groove in the head flange with a lip disposed in said groove, a portable handling ring for placing on the vessel flange when the head is removed from the vessel, and lifting means on the handling ring for engaging said lip to lift the retaining ring and the O-ring out of the groove in the vessel flange.

2. The means defined in claim 1, wherein the lifting means includes a plurality of rotatable cams spaced around the portable handling ring.

3. The means defined in claim 2, including fluid pressure actuated means mounted on the handling ring for rotating the cams to engage the lip on the retaining ring.

4. The means defined in claim 1, wherein the ledge on the retaining ring is beveled, and the lip extends horizontally from the vertical portion of the retaining ring.

5. The means defined in claim 4, wherein the beveled ledge is normally spaced from the O-ring.

6. The means defined in claim 1, wherein the head flange and the vessel flange each have two concentric grooves therein with an O-ring in each groove in the vessel flange, a retaining ring in each groove with a ledge disposed to underlie at least a portion of the O-ring in the groove, each retaining ring extending vertically into a groove in the head flange with a lip disposed in said groove, said lips extending horizontally toward each other, and the lifting means on the handling ring is disposed between said lips to engage both lips to lift both retaining rings and both O-rings out of the grooves in the vessel flange.

7. The means defined in claim 6, wherein the lifting means includes a plurality of cams rotatable to engage both lips.

8. The means defined in claim 6, including a stationary ring having grooves therein substantially duplicate of the grooves in the vessel flange for receiving the retaining rings and the O-rings when carried thereto by the portable handling ring.

9. The means defined in claim 8, wherein the stationary ring has radial slots therein for receiving a hand tool for removing the O-rings from the grooves in the stationary ring.

10. The means defined in claim 8, including fluid pressure actuated means on the portable handling ring for preventing accidental removal of the retaining rings and the O-rings when it is desired to remove the handling ring without removing the retaining rings and the O-rings.

* * * * *